UNITED STATES PATENT OFFICE.

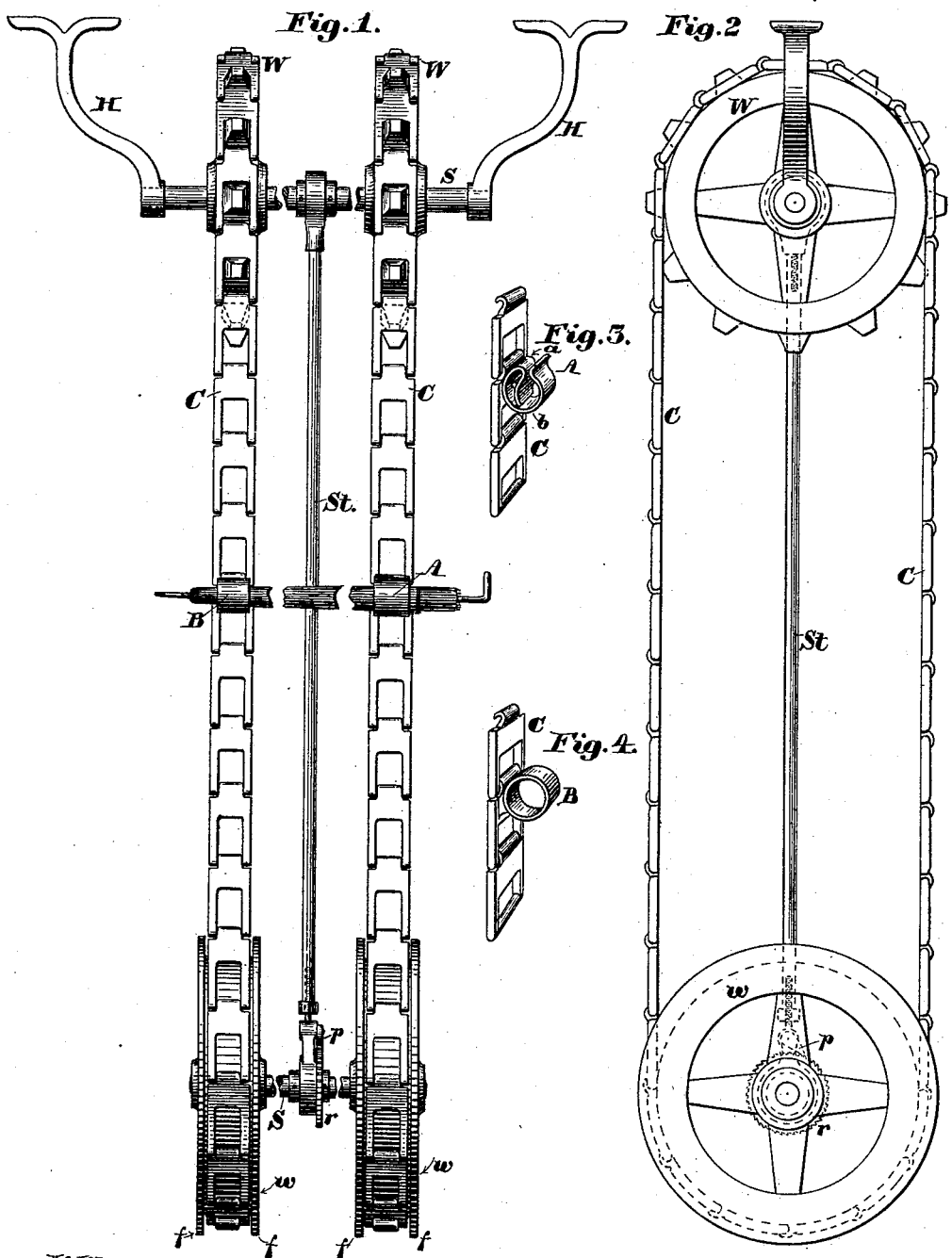

DUFF GREEN AND ROBERT M. HERRON, OF DALTON, GEORGIA.

REVOLVING EXHIBITOR FOR THE DISPLAY OF GOODS.

SPECIFICATION forming part of Letters Patent No. 486,545, dated November 22, 1892.

Application filed June 27, 1892. Serial No. 438,228. (No model.)

*To all whom it may concern:*

Be it known that we, DUFF GREEN and ROBERT M. HERRON, citizens of the United States, residing at Dalton, in the county of Whitfield and State of Georgia, have invented a new and useful Improvement in Revolving Exhibitors for the Display of Goods, with their Marked Prices, of which the following is a specification.

Our invention relates to improvements in revolving exhibitors in which two shafts set parallel, one above the other, the upper one being mounted with two sprocket-wheels and the lower with two flanged wheels, are operated by two parallel endless link chains in conjunction with an adjustable stretcher or stretchers to keep the chains taut and prevent their slipping out of place or gaining one on the other, and also in conjunction with a pawl and ratchet so arranged as to be readily thrown in or out of gear when desired, and suitable devices, according to the kind of goods to be displayed, for attaching them to the revolving mechanism; and the objects of our improvements are, first, to display goods, with marked prices, to best advantage and least wear or waste of space, time, and labor; second, to present the least obstruction to passage-ways and to keeping the floors swept and clean. We attain these objects by the mechanism illustrated in the accompanying drawings, made part of this specification, in which—

Figure 1 is a front view, and Fig. 2 a side view, of the machine. Fig. 3, at A, shows the configuration of the double springs; and Fig. 4, at B, the rings hereinafter mentioned.

Similar letters refer to similar parts.

H H represent hangers by which to attach the machine to a ceiling, side wall, or frame; S S, the upper and lower shafts; W W, the sprocket-wheels on the upper shaft; $w$ $w$, the flanged wheels on the lower shaft; $f$ $f$ $f$ $f$, the flanges; $S^t$, the adjustable stretcher; $p$, the pawl, and $r$ the ratchet; C, the chains; A, the springs, and B the rings for attaching umbrellas, canes, and other like goods to the machine.

The sprockets working in the apertures of the link-chains effectually prevent the chains slipping out of place or gaining one on the other, and in a machine thus constructed it is not necessary to distribute the weights by alternating the springs and rings, and for convenience of handling all the handles can be placed on the same side.

We use flanged wheels on the lower shaft because the chains will more readily adjust themselves and will not bind thereon, as they might do if sprocket-wheels were used on both shafts.

The stretcher $S^t$ may be of metal or wood and adjustable by any device known to mechanics. In the accompanying drawings this is done by a screw and jam-nut, the screw fitting up into an iron pipe and the nut bearing on the lower end. By unscrewing the nut the stretcher is lengthened and chains tightened. The use of one or two stretchers is simply a question of taste and ornament, the purpose being to hold the chains taut and in place, which is as readily effected by one stretcher as by two.

For the display of umbrellas, canes, or other similar goods the springs A and rings B are fastened to suitable attachments, which are inserted in the link chains at suitable distances and should be horizontally opposite to each other, so that the small ends can be slipped into the rings and the handle ends, with price-marks exposed to view, into the springs. The springs may be of any suitable metal and should be double and of the configuration shown in Fig. 3—that is to say, the inner jaw or side next the chain should be bent at the top $a$ and doubled back, extending in a curved line downward to or near the bottom $b$, while the outer jaw should curve upward, as at A, the two jaws thus forming a circular bed for the goods to rest in. This shape admits of the goods being more readily placed on or taken from the machine. On trial of many shapes all but this were found to be either too tight for ready handling of the goods or too loose to hold them securely when the mouth of the spring turned downward by the revolution of the machine.

Cutlery and dress or other goods can be attached to the machine by such devices as their special character may require.

The ratchet $r$ and pawl $p$ hold the machine still when desired for loading or other purposes. They may be placed on the lower shaft, as shown in Figs. 1 and 2, or on the upper, as the merchant may prefer, with any suitable device for throwing them in or out of gear. When in gear one man can load the machine, and when out of gear a slight touch of the hand will cause the machine to revolve in either direction and brings the goods, with price-marks, to the level of the seller's eye or to any position the purchaser may desire for better inspection. By substituting as equivalents two rollers suitably flanged or grooved for the two shafts and wheels above described and for the two link chains two cheap belts a machine may be constructed much more cheaply, which, in conjunction with the adjustable stretcher, ratchet, and pawl, may be made to work to some degree of satisfaction; but on such a machine the weights must be evenly distributed, as by alternating the springs and rings, and with the greatest care in loading and handling it would require frequent readjustment.

We do not claim any of the well-known mechanical devices herein mentioned.

What we claim, and desire to secure by Letters Patent, is—

1. The combination, in a revolving exhibitor for the display of goods, of two parallel shafts, one mounted with two sprocket-wheels and the other having two flanged wheels, the upper shaft fastened to a ceiling, side wall, or frame and the lower shaft hanging loose, supported and operated by two parallel endless link-chains, in the apertures of which the sprockets work, in conjunction with an adjustable stretcher, and the springs A and rings B, the ratchet $r$, and pawl $p$, substantially as set forth, and for the purposes specified.

2. In a revolving exhibitor, the combination of two flanged or grooved rollers, one fastened to a ceiling, side wall, or frame and the other hanging loose, supported and operated by two parallel belts, in conjunction with an adjustable stretcher, a ratchet and pawl, and devices for attaching goods to said belts, all substantially as set forth, and for the purposes specified.

DUFF GREEN.
R. M. HERRON.

Witnesses:
FRANK MANLY,
JOHN S. THOMAS.